(No Model.) 2 Sheets—Sheet 1.

G. K. COOKE.
DIAL FOR TIME PIECES.

No. 436,051. Patented Sept. 9, 1890.

Witnesses:
Geo. W. Miatt
D. W. Gardner

Inventor:
G. K. Cooke
by his Attorney
A. Livingston Bogart (No Model.) 2 Sheets—Sheet 2.
G. K. COOKE.
DIAL FOR TIME PIECES.
No. 436,051. Patented Sept. 9, 1890.
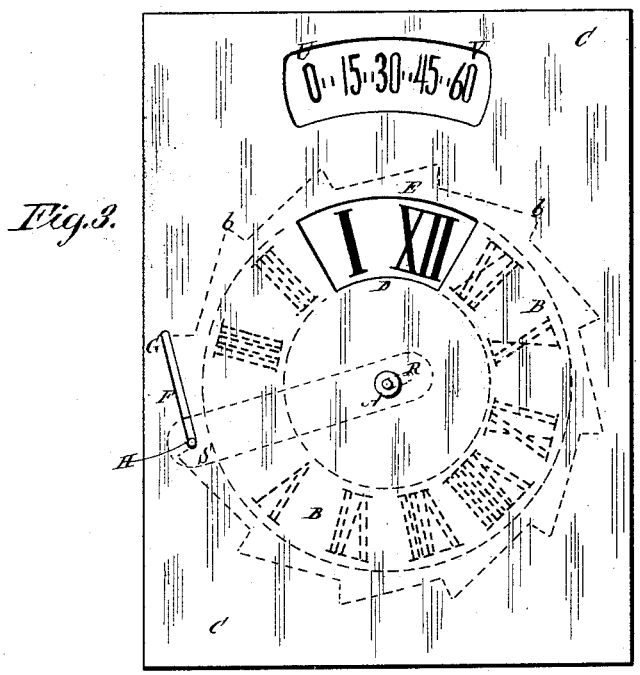
Fig. 3.
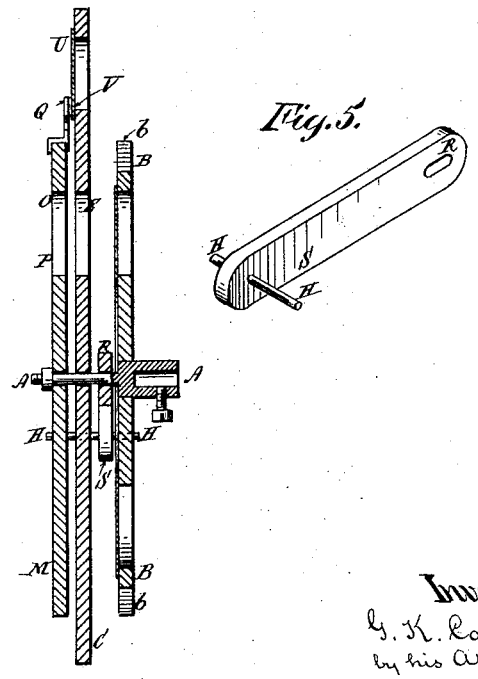
Fig. 4.
Fig. 5.
Witnesses:
Geo. W. Hiatt
D. W. Gardner
Inventor:
G. K. Cooke
by his Attorney
A. Livingston Bogart
THE NORRIS PETERS CO., PHOTO-LITHO., WASHINGTON, D. C.

UNITED STATES PATENT OFFICE.

GEORGE K. COOKE, OF JAMAICA, NEW YORK.

DIAL FOR TIME-PIECES.

SPECIFICATION forming part of Letters Patent No. 436,051, dated September 9, 1890.

Application filed September 19, 1889. Serial No. 324,447. (No model.)

*To all whom it may concern:*

Be it known that I, GEORGE K. COOKE, a citizen of the United States, and a resident of the town of Jamaica, county of Queens and State of New York, have invented a new and useful Improvement in Dials; and I do hereby declare that the following is a full, clear, and exact description of the invention, reference being had to the accompanying drawings, forming part of this specification.

My invention relates to an indicating-dial for time, liquid, or other measuring instruments.

Heretofore it has been the custom to construct such dials as a disk or cylinder, upon the surface of which the divisions have been figured, a hand being made to pass from one division to the next, either gradually by a continuous motion or by a series of short jumps. Such dials, particularly in the smaller sizes, are confusing and difficult to read, especially at night. To obviate this difficulty dials have been constructed in which all the divisions but one have been concealed from sight, such single division remaining disclosed until suddenly changed by the measuring-instrument for the succeeding one. This last arrangement, however, necessitates a special construction of the measuring mechanism, so that a full jump may be made from one division to the next, and also prevents, consequently, any indication being made of the fractional parts of a division.

My invention consists, first, in an improved construction of dial in which only the last full division of the dial is visible, although the dial itself is or may be in constant motion, the dial-number being suddenly changed when the figured dial has advanced the angular distance of one graduation; secondly, in the device by which fractional parts of a division may be indicated, and, thirdly, in the method of construction by which the dial may be illuminated from the rear for night use.

In the annexed drawings an embodiment of my invention is given as adapted to clocks or time-measuring instruments, in which—

Figure 1:
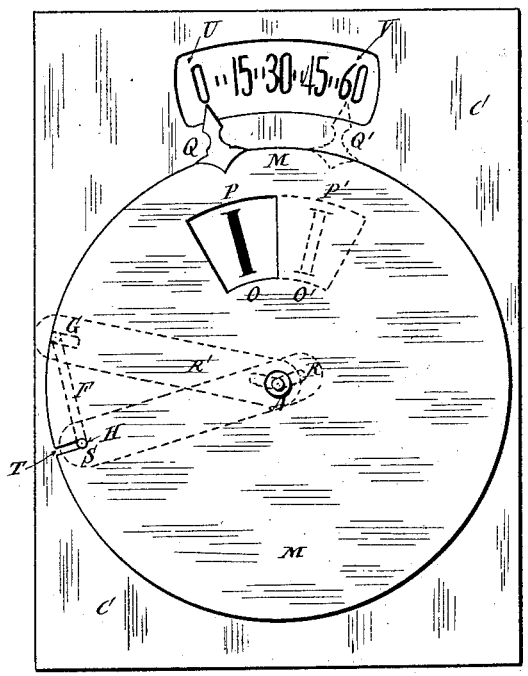
Figure 2:
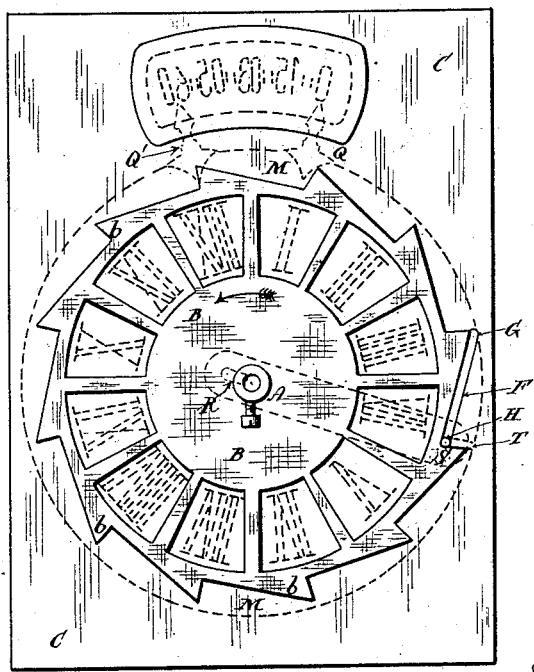

Figure 1 represents a front view, and Fig. 2 a rear view, of the same. Fig. 3 is a front view of the supporting or stationary plate with the front screen removed. Fig. 4 represents a vertical section of Fig. 1, the thickness and distances apart of the various plates being exaggerated for the sake of clearness. Fig. 5 is a perspective view of the dog or operating-pawl.

Similar letters appearing in the various figures indicate similar parts.

Referring to the figures, A indicates an arbor, which may be attached to the minute-arbor of an ordinary clock. Rigidly connected thereto is a disk B, provided at its periphery with a number of ratchet-teeth *b b b*, one tooth for each full division of the dial. The face of this disk carries the figures denoting the various full divisions, as the hours from I to XII; but they are reversed in their order, so that the numbers run in the opposite direction to the motion of the toothed disk when it is revolved by the clock.

In front of the rotating toothed disk is immovably fixed a supporting-plate C, having a hole through which freely passes the arbor A A, and also has an opening D E, of such size and so located that two of the dial-divisions on the rotating toothed disk B may be visible through it, as shown in Fig. 3. There is further cut in the fixed plate C a slot F G, of such length and so inclined that, as shown in Fig. 3, a pin H would be raised by a tooth of the rotating disk from the bottom of the slot nearly to the top thereof, where it would escape therefrom and fall upon the succeeding tooth.

In front of the fixed plate C and pivoted loosely upon the arbor A is a plate or screen M, which may have any desirable form, provided with a window O P, of the width of one full division of the scale of the toothed disk B. The screen M is further supplied with a slot T, so located and of such size that the pin H will always remain within it, whatever position the pin H may occupy in the long slot F G in the fixed plate C.

Between the toothed disk B and the fixed plate C is loosely pivoted on the arbor A a lever S, to which the pin H is rigidly attached, and has a slot at R, of such length as to give it freedom of motion longitudinally to permit the pin H to rise and fall the full length of the inclined slot F G in the fixed plate C.

The operation of the dial is as follows: The parts being in their normal positions, the lever S, as shown in Figs. 1, 2, and 3, and the window in the screen O P, over and disclosing a number, say the figure I of the dial. If, now, the time-movement be put in operation, the toothed disk will be caused to slowly rotate in the direction of the hands of a clock, and as the pin H rests against the inner portion of the tooth such tooth will engage with and move the pin H upward along the slot F G, the pin at the same time communicating the same rate of angular motion to the screen M, thus keeping the hour-number I on the toothed disk and the window in the screen in their relative positions, although both are traveling to the right, until finally the window and scale number will have attained the position shown in the dotted lines O' P' at the end of the hour and the lever and pin the dotted position R' G, Fig. 1. The pin H, having reached the extremity of the ratchet-tooth, will now escape from the end of the tooth, and the lever S, owing to its weight, will be returned to its first position, the screen M accompanying it, and the window retreat to O P, disclosing the next hour-number upon the scale. Instead of employing the weight of the lever to return the parts at the expiration of the hour, the screen M may be unequally weighted, or a spring may be used. It will be thus seen that, although during any given hour only the dial-number indicating that hour is visible through the window, still the window travels forward with the dial at the same rate to be returned at the end of the hour suddenly to its original place, disclosing the following hour-number.

In carrying out this principle of my invention I do not limit myself to the exact embodiment shown in the drawings. The dial may be hemispherical or cylindrical. The position of the plates may be varied relatively to one another, the toothed disk being placed in front of the fixed plate C, instead of behind it, the screen M pivoted eccentrically instead of concentrically with the toothed disk. As the lever S and pin H serve simply as a pawl to communicate or transmit motion between the toothed wheel and screen, the lever S may be omitted and any other means be employed to support the pawl-acting pin H.

It will also be seen that my invention admits of duplication. As in the case of a clock, one set of plates may be attached to the minute-arbor and another to the hour-arbor, the interior set being made the largest.

The following is my method of indicating the fractional parts of the main dial-division: A pointer or index Q is attached to the screen and travels with it. The distance of the full amount of travel of the index is divided off into the proper fractional divisions on the fixed plate, as shown in Fig. 1, U V, the fractional divisions, being in this case the sixtieth part of one hour, in five-minute divisions. Each separate minute may be indicated by a graduation, if desired. Thus the number seen through the window will at any time show the hour, while the index points out the number of minutes that have elapsed during the hour. It is apparent that the positions of index and fractional scale-divisions could be reversed, the last being upon the screen and the first on the fixed plate.

For the purpose of illuminating the dial at night, the toothed disk, fixed plate, and screen may be made of any suitable transparent or translucent material, the parts to remain invisible rendered opaque.

For purposes of simplicity and cheapness I prefer to construct my dial as follows, when it is to be illuminated from a light source placed behind it: A series of windows are cut through the material of the toothed disk, one for each scale-division, as shown in the rear view of the toothed disk in Fig. 2. Over these windows, with the scale-numbers thereon, is stretched any translucent material—as, for instance, paper. The same may be done with the fractional scale-division.

My improved dial is applicable not only to clocks, but to any other description of meter.

Having thus fully described the nature of of my invention, what I desire to claim and cover by Letters Patent, is—

1. In an indicating-dial for time or other meters, the combination of a toothed dial B, bearing upon its face figured scale-divisions, a screen M, provided with a window O P, and a pivoted lever provided with a pin connecting said dial and screen, so that both dial and screen shall move forward in one direction together the distance of one scale-division, the screen being then returned in the opposite direction suddenly, substantially as and for the purpose specified.

2. In an indicating-dial for time or other meters, the combination of a toothed dial B, bearing upon its face figured scale-divisions, a fixed plate C, provided with a slot F G, a screen M, provided with a window O P, and a pawl-acting pin H, all coacting substantially as and for the purpose specified.

3. In an indicating-dial for time or other meters, the combination of a toothed dial B, bearing upon its face figured scale-divisions, a fixed plate C, provided with a slot F G, a screen M, provided with a window O P, and a pin H, attached to a pivoted lever S, said pin engaging with the teeth of the toothed dial and with the screen, substantially as and for the purpose specified.

4. In an indicating-dial for time or other meters, the fractional fixed scale U V, and its index Q, with the mechanism for gradually moving the index in one direction over the scale and then causing it to return suddenly in the opposite direction, consisting of the toothed wheel B, pivoted plate M, to which the index Q is attached, and the pawl-acting device H, substantially as and for the purpose specified.

5. In an indicating-dial for time or other meters, the combination of the fixed plate C, provided with the scale U V and slot F G, the toothed wheel B, an oscillating plate M, with the index Q attached thereto, and the pin H, freely sliding in the slot F G and engaging in the teeth of the toothed wheel and with the plate M carrying the index, by which the forward motion of the toothed wheel is transmitted to the index, substantially as and for the purpose specified.

6. In an indicating-dial for time or other meters, the combination of the fixed plate C, with the scale U V and slot F G, the toothed wheel B, oscillating plate M, with the index Q attached thereto, and the loosely-pivoted lever S, with its pin H, all coacting together, substantially as and for the purpose specified.

7. In an indicating-dial for time or other meters, the combination of the toothed dial B, provided with windows cut through the material, one for each scale-division, a translucent material stretched over these windows bearing the scale-numbers, a screen provided with a window O P and an index Q, a fixed plate M, provided with a slot F G, and a window over which is stretched a translucent material bearing the fractional scale U V, and a pin H to transmit the motion of the toothed dial to the screen M and index Q, all arranged and operating substantially as herein set forth.

G. K. COOKE.

Witnesses:
CEO. W. MIATT,
D. W. GARDNER.